(12) United States Patent
Nakashima et al.

(10) Patent No.: US 12,523,341 B2
(45) Date of Patent: Jan. 13, 2026

(54) CONNECTION STRUCTURE FOR CARTRIDGE AND GAS CONSUMPTION DEVICE

(71) Applicant: TOYOTA JIDOSHA KABUSHIKI KAISHA, Toyota (JP)

(72) Inventors: Tomoki Nakashima, Nagoya (JP); Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 18/413,473

(22) Filed: Jan. 16, 2024

(65) Prior Publication Data

US 2024/0337353 A1    Oct. 10, 2024

(30) Foreign Application Priority Data

Apr. 5, 2023    (JP) .................................. 2023-061197

(51) Int. Cl.
*F17C 5/06*    (2006.01)
*F17C 13/04*    (2006.01)

(52) U.S. Cl.
CPC ............... *F17C 5/06* (2013.01); *F17C 13/04* (2013.01); *F17C 2205/0332* (2013.01); *F17C 2205/0352* (2013.01)

(58) Field of Classification Search
CPC .... F17C 5/06; F17C 13/04; F17C 2205/0332; F17C 2205/0352; F17C 1/00; F17C 13/084
USPC ..................................... 141/4; 285/361, 376
See application file for complete search history.

(56) References Cited

U.S. PATENT DOCUMENTS

| | | | | |
|---|---|---|---|---|
| 3,454,199 A | * | 7/1969 | Malick ................. | B67D 1/0832 222/400.7 |
| 3,473,556 A | * | 10/1969 | Marine ................ | B67D 1/0832 285/107 |
| 4,025,080 A | * | 5/1977 | Gedeon ............... | B66F 9/07518 280/834 |
| 5,280,876 A | * | 1/1994 | Atkins ................. | A61M 39/26 604/905 |
| 5,848,604 A | * | 12/1998 | Eihusen ............... | F16K 17/383 137/72 |

(Continued)

FOREIGN PATENT DOCUMENTS

JP    2008-151186 A    7/2008

*Primary Examiner* — Kenneth Rinehart
*Assistant Examiner* — Stephanie A Shrieves
(74) *Attorney, Agent, or Firm* — SoraIP, Inc.

(57) ABSTRACT

Among the connectors between the cartridge and the gas consumption device, one of the connectors has a plurality of positioning teeth protruding from the outer circumferential surface formed at intervals in the circumferential direction around the axis. A plurality of positioning grooves having groove widths corresponding to circumferential tooth widths of the positioning teeth are formed at intervals in the circumferential direction of the inner peripheral surface of the other connector. The inner peripheral surface of the other connector is further formed with a rotation groove in which the positioning teeth that have passed through the positioning groove rotate around the axis. A stopper is formed in the rotation groove to which one positioning tooth comes into contact so as to limit rotation of the cartridge at a predetermined rotation angle.

2 Claims, 6 Drawing Sheets

(56) References Cited

U.S. PATENT DOCUMENTS

| | | | | |
|---|---|---|---|---|
| 6,050,609 | A * | 4/2000 | Boscaljon | F16L 19/0206 |
| | | | | 285/357 |
| 6,730,218 | B2 * | 5/2004 | Bozenmayer | B01D 29/52 |
| | | | | 285/376 |
| 7,059,582 | B2 * | 6/2006 | Adams | F16K 15/026 |
| | | | | 251/149.6 |
| 7,617,842 | B2 * | 11/2009 | Curello | F16L 37/32 |
| | | | | 137/630.14 |
| 7,631,901 | B2 * | 12/2009 | Diehl | B60K 15/07 |
| | | | | 280/834 |
| 2008/0202629 | A1 * | 8/2008 | Michel | F17C 5/04 |
| | | | | 141/82 |
| 2014/0290611 | A1 * | 10/2014 | Abd Elhamid | F17C 11/007 |
| | | | | 48/127.3 |
| 2018/0299055 | A1 * | 10/2018 | Thomas | F16L 37/40 |
| 2019/0226641 | A1 * | 7/2019 | Ogiwara | F17C 13/12 |
| 2023/0272885 | A1 * | 8/2023 | Hellmann | F17C 13/12 |
| | | | | 220/586 |
| 2025/0290606 | A1 * | 9/2025 | Annajah | B60K 15/067 |

* cited by examiner

CONNECTION STRUCTURE FOR CARTRIDGE AND GAS CONSUMPTION DEVICE

CROSS-REFERENCE TO RELATED APPLICATION

This application claims priority to Japanese Patent Application No. 2023-061197 filed on Apr. 5, 2023, incorporated herein by reference in its entirety.

BACKGROUND

1. Technical Field

The present disclosure relates to a connection structure for a cartridge and a gas consumption device.

2. Description of Related Art

For example, Japanese Unexamined Patent Application Publication No. 2008-151186 (JP 2008-151186 A) proposes a vehicle in which a tank storing gas for power generation in a fuel cell is connected to a fuel cell system or the like serving as a gas consumption device.

SUMMARY

It is assumed that a cartridge including a tank is detachably connected to the gas consumption device. In emergency, it is desirable that the gas that fills the tank of the cartridge be released in a predetermined circumferential direction via a safety valve. However, there is a possibility that the gas cannot be released in the predetermined circumferential direction depending on the connection position of the cartridge attached to the gas consumption device.

The present disclosure has been made in view of such a problem, and provides a connection structure for a cartridge and a gas consumption device in which gas can be released from the cartridge in a predetermined circumferential direction.

In view of the above problem, the connection structure for a cartridge and a gas consumption device according to the present disclosure is a connection structure configured to detachably connect a columnar cartridge including a tank that stores gas and a gas consumption device configured to consume the gas with the cartridge housed in the gas consumption device.

The cartridge includes a safety valve configured to release the gas stored in the tank in a predetermined circumferential direction of the cartridge.

The gas consumption device includes a housing portion that houses the cartridge.

The housing portion has an insertion port through which the cartridge is inserted along an axis of the cartridge.

The connection structure includes a first connector provided on a distal end side of the cartridge in an insertion direction, and a second connector provided in the gas consumption device and connected to the first connector.

One connector out of the first connector and the second connector includes an outer circumferential surface. A plurality of positioning teeth protruding from the outer circumferential surface of the one connector is provided on the outer circumferential surface with intervals in a circumferential direction about the axis.

The other connector includes an inner circumferential surface that faces the outer circumferential surface. A plurality of positioning grooves each having a groove width corresponding to a circumferential tooth width of each of the positioning teeth is provided on the inner circumferential surface with intervals in a circumferential direction of the inner circumferential surface of the other connector.

Rotation grooves along which the positioning teeth that have passed through the positioning grooves rotate about the axis relative to the other connector when the cartridge is inserted are further provided on the inner circumferential surface of the other connector.

The rotation groove includes a stopper with which at least one of the positioning teeth comes into contact to limit rotation of the cartridge at a predetermined rotation angle.

According to the present disclosure, the columnar cartridge can be inserted into the housing portion through the insertion port of the gas consumption device, and the first connector provided on the insertion side of the cartridge can be connected to the second connector provided in the housing portion. Specifically, the positioning teeth of the one connector out of the first and second connectors are caused to pass through the positioning grooves of the other connector, and the first and second connectors are rotated along the rotation grooves about the axis relative to each other. When the positioning tooth comes into contact with the stopper of the rotation groove, the relative rotation of the first and second connectors is limited. In this way, the cartridge and the gas consumption device are connected. In this way, the cartridge can be rotated to the predetermined angle after the cartridge has been inserted into the gas consumption device. Even when the area around the gas consumption device with the cartridge connected is exposed to a high temperature environment, the gas stored in the tank can be released in the predetermined direction via the safety valve provided in the cartridge.

In the connection structure, the tooth width of at least one of the positioning teeth may be different from the other tooth widths.

In the connection structure, the gas consumption device may include a pulling device configured to pull the cartridge housed in the housing portion into the gas consumption device with the positioning tooth in contact with the stopper. The cartridge may include a sealing valve configured to seal an internal space of the tank with a valve body by urging the valve body toward an outside of the tank along the axis. The gas consumption device may include a push rod configured to push the valve body toward the internal space to open the sealing valve by pulling the cartridge with the pulling device.

According to the present disclosure, the gas can be released from the cartridge in the predetermined circumferential direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, one embodiment of the connection structure of a cartridge and a gas consumption device according to the present disclosure will be described in detail based on the drawings.

1A to 3B, a connection structure 1 according to the present embodiment is a structure that connects a cartridge 10 and a gas consumption device 30 in a detachable manner. The gas consumption device 30 is, for example, a fuel cell system or a fuel cell electric vehicle that uses hydrogen gas. The cartridge 10 has a substantially cylindrical shape. Cartridge 10 supplies hydrogen gas to gas consumption device 30. The gas consumption device 30 includes a housing portion 31 that houses the cartridge 10. In this embodiment, the gas consumption device 30 is formed with three cylindrical recessed housing portions 31 arranged in the vertical direction. An insertion port 31a into which the cartridge 10 is inserted is formed in the housing portion 31.

The cartridge 10 includes a tank 15 that stores gas therein. The tank 15 is protected by an exterior body 16. The cartridge 10 is provided with a safety valve 51. The safety valve 51 releases hydrogen gas stored in the tank 15 in a predetermined circumferential direction of the cartridge 10. The cartridge 10 is provided with a first connector 20 that constitutes the connection structure 1. The gas consumption device 30 is provided with a second connector 40 that connects to the first connector 20. The first connector 20 is provided on the distal end side of the cartridge 10 in the insertion direction. The second connector 40 is provided closer to the inside of the gas consumption device 30 than the housing portion 31 is. The cartridge 10 includes a handle 11 on the side opposite to the first connector 20 for inserting the cartridge 10 into the housing portion 31. "One connector" of the present disclosure corresponds to the first connector 20, and "the other connector" of the present disclosure corresponds to the second connector 40.

Figure 2A:
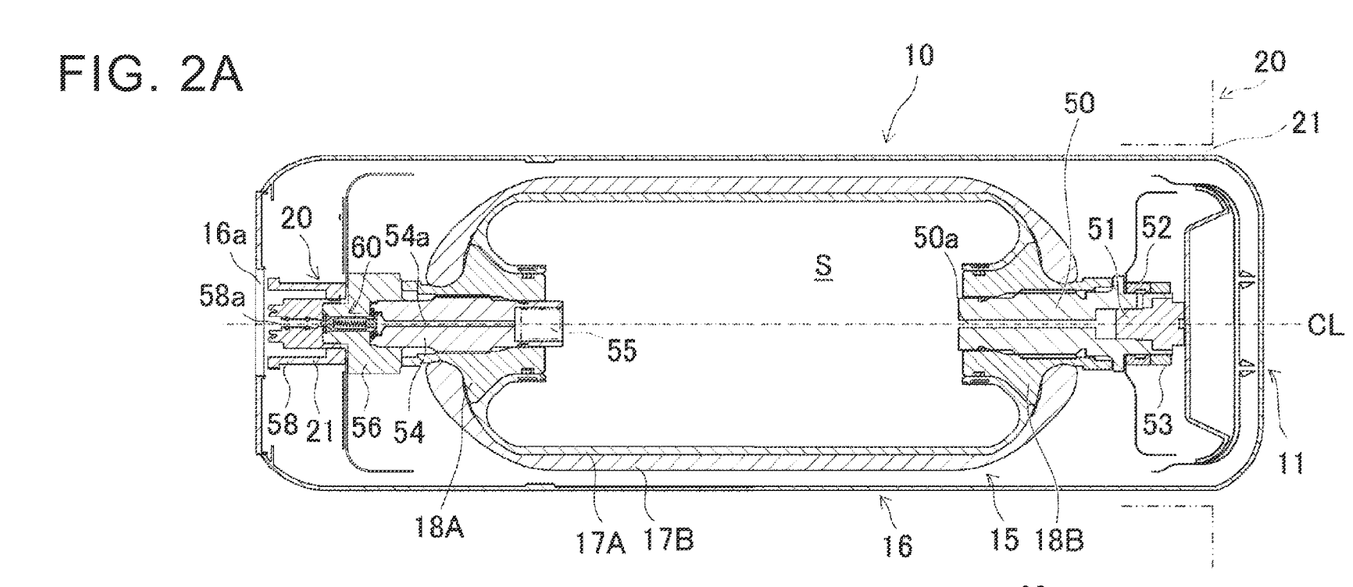
FIG. 2A is a longitudinal cross-sectional view along the axis of the cartridge shown in FIG. 1B.
Figure 2B:
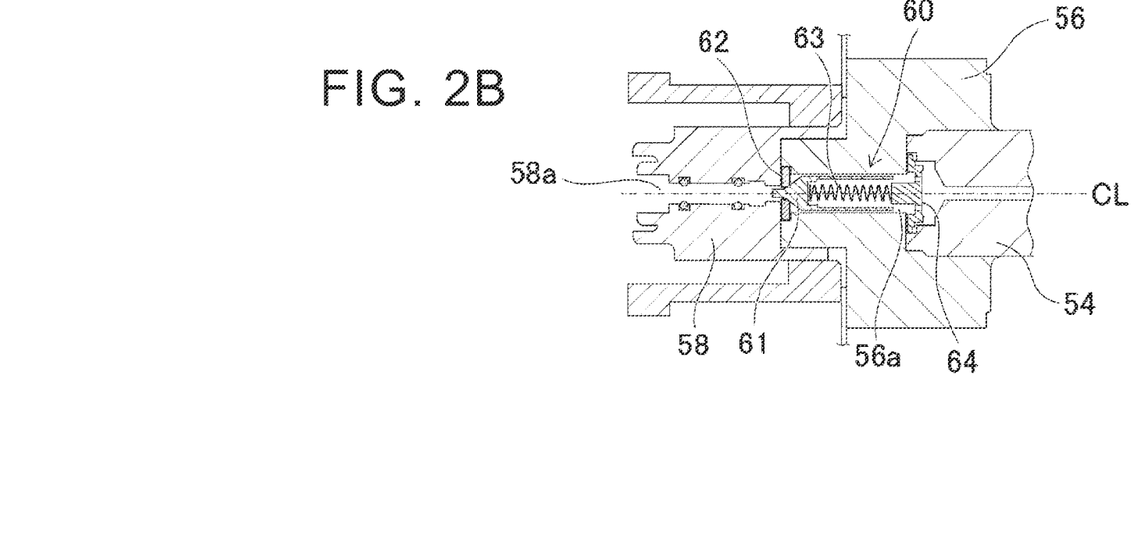
FIG. 2B is an enlarged sectional view of the main part of FIG. 2A.

As shown in FIGS. 2A and 2B, the cartridge 10 includes a tank 15 that stores hydrogen gas, and an exterior body 16 that protects the tank 15 so as to cover the tank 15. Specifically, although not shown in detail, the tank 15 is supported by the exterior body 16 via a metal frame (not shown) or the like located around the tank 15. The first connector 20 is located inside an opening 16a (see FIG. 1B) formed on the distal end side of the exterior body 16.

The tank 15 has a resin liner 17A that accommodates hydrogen gas under high pressure, and an FRP reinforcing layer 17B that covers the liner 17A. The tank 15 includes caps 18A and 18B having through holes extending along the axis at both ends of a cylindrical axis. The caps 18A, 18B are in close contact with the liner 17A and the reinforcing layer 17B.

The gas consumption device 30 is equipped with a pulling device 35. The pulling device 35 retracts the cartridge 10 into the gas consumption device 30 along the axis CL of the cartridge 10 with the cartridge 10 accommodated in the housing portion 31. More specifically, the pulling device 35 retracts the cartridge 10 into the gas consumption device 30 with the positioning teeth 22 (described later) in contact with the stopper 45. The pulling device 35 may have a function of returning the retracted state to the original position. By drawing in the cartridge 10, the stored hydrogen gas is supplied to the gas consumption device 30. After using the hydrogen gas in the cartridge 10, the cartridge 10 is returned to its original position in the housing portion 31 and taken out from the housing portion 31.

A safety valve plug 50 is sealed to the axis CL of the base 18B on the handle 11 side. The safety valve plug 50 is formed with gas release holes 50a and 50b. A safety valve 51 is embedded in the safety valve plug 50 so as to close the gas release hole 50a. The safety valve 51 includes a plug made of a fusible alloy, and the plug melts in a high temperature environment. At this time, the internal space of the tank 15 is opened and the stored gas is released in a predetermined direction of the cartridge 10 through the gas release holes 50a, 50b.

Figure 3A:
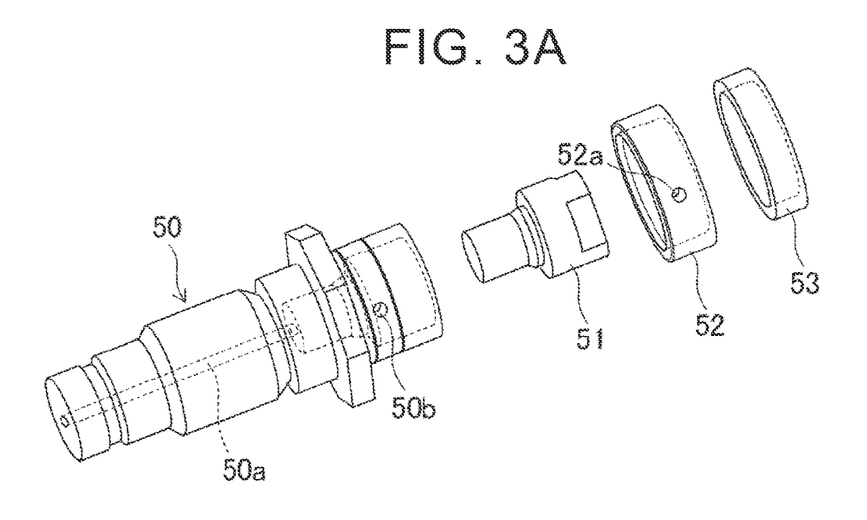
FIG. 3A is an exploded perspective view showing members around the safety valve of the cartridge shown in FIG. 2A.

An inner ring 52 and an outer ring 53 are attached to the safety valve plug 50 at a portion located outside the tank 15. As shown in FIG. 3A, inner ring 52 is rotatably retained on safety valve plug 50. The outer ring 53 is fixed to the safety valve plug 50 to prevent the inner ring 52 from falling off.

A gas release hole 50b is formed in the safety valve plug 50 so as to be perpendicular to the axis CL, and communicates with the gas release hole 50a of the axis CL. The safety valve 51 blocks the gas release holes 50a and 50b. In the inner ring 52, one direction regulating hole 52a is formed in the radial direction, passing through the peripheral wall.

As shown in FIGS. 2A and 2B, a flow plug 54 is sealed to the tip side cap 18A so as to pass through the axis CL, and a gas flow hole 54a passing through the axis CL is formed. An overflow suppressing valve 55 is attached to the flow plug 54 so as to be located inside the tank 15. The overflow suppressing valve 55 has the function of suppressing a large amount of hydrogen gas from flowing out in an emergency, and also limiting the flow rate of hydrogen gas to a necessary amount in normal times. A block-shaped valve body 56 is connected to the flow plug 54 on the side opposite to the tank 15 in an airtight manner. The valve body 56 is provided with a manual valve 57 (see FIG. 3B) on the outside of the tank 15. The manual valve 57 is a valve for manually releasing hydrogen gas in the tank 15. When opening and closing the manual valve 57, the exterior body 16 of the cartridge 10 is removed and the tank 15 is exposed and operated.

As shown in FIGS. 2A and 2B, a self-closing valve 60 is attached to the axis CL of the valve body 56 as a sealing valve that seals the internal space of the tank 15 with a valve body 61. The self-closing valve 60 is opened when the cartridge 10 is set in the gas consumption device 30, and is closed in other situations. The self-closing valve 60 includes a valve body 61 and a disc-shaped valve seat 62 on which the valve body 61 approaches and separates. The valve body 61 is movably mounted in the valve through hole 56a of the valve body 56. The valve body 61 is biased toward the outside of the tank 15 along the axis CL. Thereby, the valve body 61 seals the internal space S of the tank 15. A valve spring 63 and a spring receiver 64 urge the valve body 61 against the valve seat 62. The spring receiver 64 has a through hole through which gas can pass. Therefore, the self-closing valve 60 closes while the valve body 61 is biased by the valve spring 63. The self-closing valve 60 is opened when a valve body 61 is moved by a push rod 32 of a gas consumption device 30, which will be described later.

A first connector 20 for connecting to the gas consumption device 30 is fixed to the end of the valve body 56. The first connector 20 has a cylindrical member 21 fixed thereto. As shown in FIGS. 2A and 2B, a shaft guide 58 that guides the push rod 32 is fixed to the inner peripheral side of the cylindrical member 21. A gas flow hole 58a is formed in the shaft guide 58 at the axis CL. The valve seat 62 of the self-closing valve 60 faces the opening of the gas flow hole 58a, and is held between the valve body 56 and the shaft guide 58.

Figure 4:
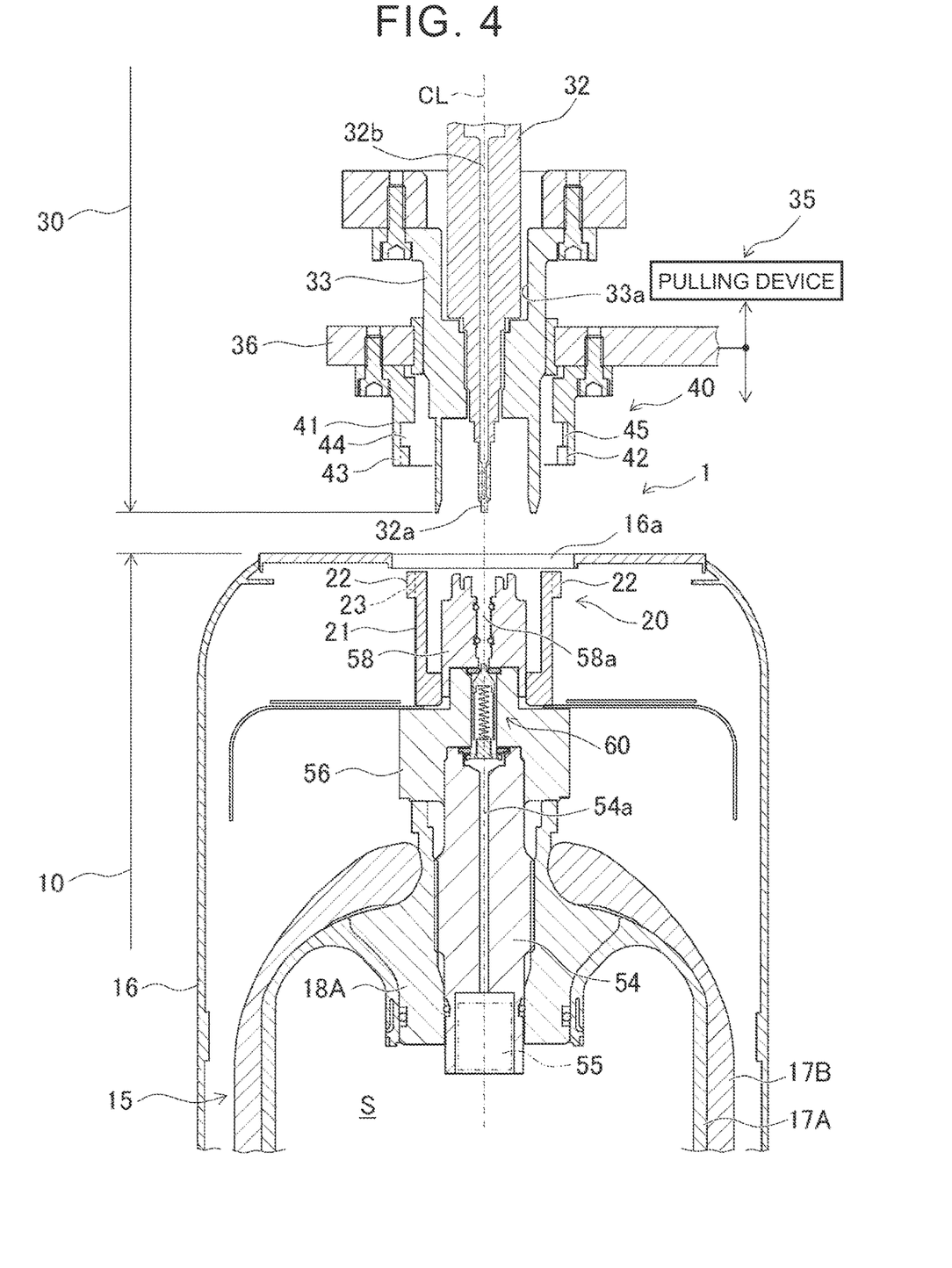
FIG. 4 is an exploded sectional view of the main parts showing the connection structure of the cartridge and the gas consumption device.

As shown in FIG. 4, a push rod 32 is fixed to the gas consumption device 30. Push rod 32 is a stepped rod. An abutting portion 32a is formed at the tip of the push rod 32. The push rod 32 is formed with a gas flow hole 32b through which hydrogen gas flows along the axis CL. The gas flow hole 32b branches at the base end of the abutting portion 32a. A guide shaft member 33 is fitted around the outer periphery of the push rod 32. A guide hole 33a into which the push rod 32 can be inserted is formed in the axial center of the guide shaft member 33.

A cylindrical member 41 of the second connector 40 is fitted onto the guide shaft member 33. The cylindrical member 41 is fixed to the conveying member 36 of the pulling device 35. The pulling device 35 moves the conveying member 36 toward the proximal end of the push rod 32 along the axis CL of the cartridge 10. As a result, the second connector 40 is drawn into the gas consumption device 30, and the cartridge 10 connected to the second connector 40 is also drawn in. Thereby, the push rod 32 pushes the valve body 61 toward the internal space S of the tank 15 and opens the self-closing valve 60. Note that the pulling device 35 returns the cartridge 10 to its original position by moving the conveying member 36 in the opposite direction. The second connector 40 is provided on the side facing the cartridge 10. The second connector 40 is provided at the axis of the cylindrical housing portion 31 that accommodates the cartridge 10.

Here, as shown in FIGS. 3B and 5A to 5C, the first connector 20 includes a cylindrical member 21. As shown in FIGS. A plurality of positioning teeth 22 protruding from the outer circumferential surface 20a of the cylindrical member 21 are formed in the outer circumferential surface 20a at intervals in the circumferential direction about the axis CL of the cartridge 10. Specifically, four positioning teeth 22 are formed at a 90° pitch. The three positioning teeth 22 have the same tooth width α1, and the remaining positioning tooth 22 has a tooth width α2 larger than the tooth width α1. The tooth widths α1 and α2 of the positioning teeth 22 correspond to the groove widths β1 and β2 of the positioning grooves 42.

Figure 3B:
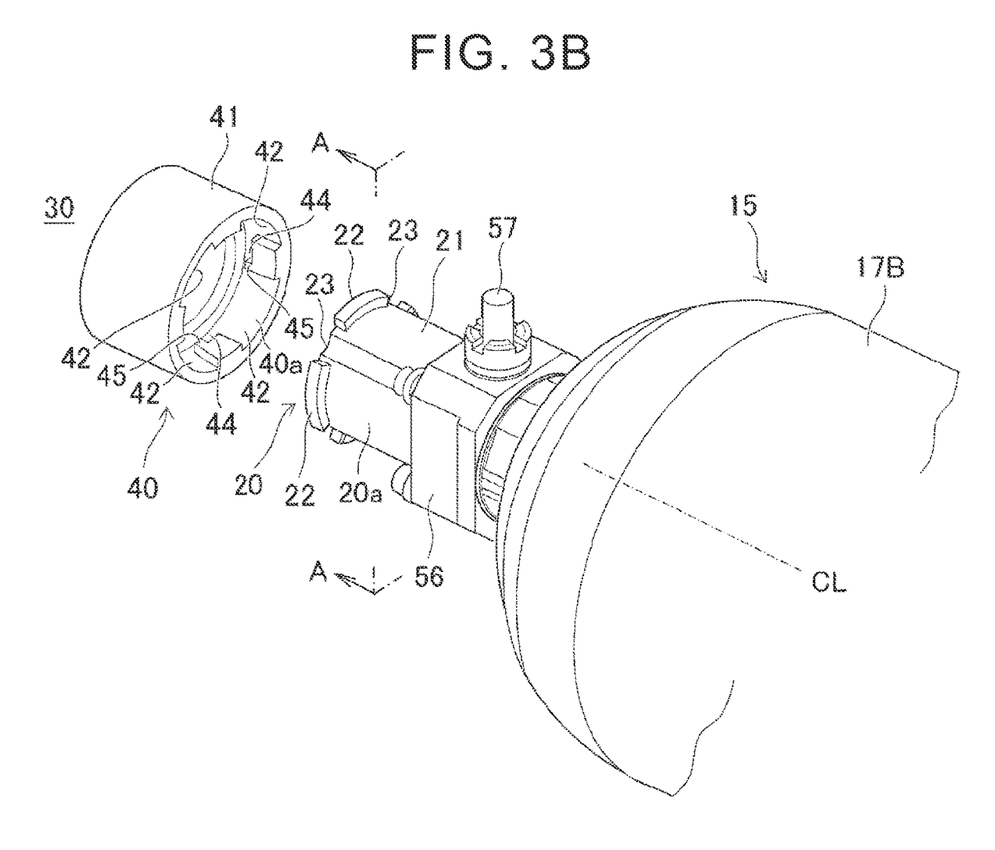
FIG. 3B is an exploded perspective view showing the first connector on the cartridge side and the second connector on the gas consumption device side of the coupling structure of the present embodiment.
Figure 5A:
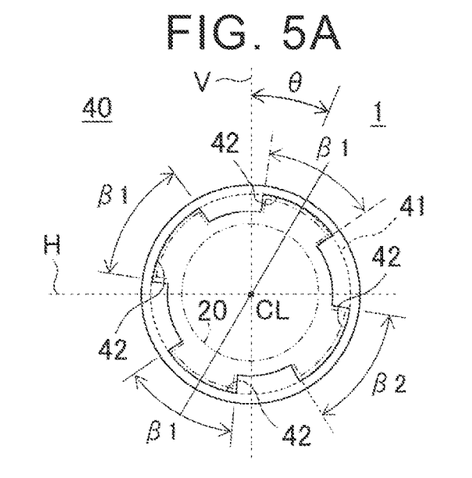
FIG. 5A is a schematic diagram showing the first connector and the second connector as seen along line AA in FIG. 3B, and showing the positioning groove of the second connector.

The second connector 40 is provided on the inner periphery of a cylindrical member 41 fixed to the conveying member 36. The cylindrical member 41 has an inner circumferential surface 40a formed therein. The inner circumferential surface 40a faces the outer circumferential surface 20a of the first connector 20. As shown in FIGS. 3B and 5A, a plurality of positioning grooves 42 are formed at intervals in the circumferential direction of the inner circumferential surface 40a of the cylindrical member 41. The positioning groove 42 has a groove width corresponding to the tooth width of the positioning tooth 22 in the circumferential direction.

As shown in FIG. 5A, in this embodiment, four positioning grooves 42 are formed along the inner circumference of the cylindrical member 41 at a pitch of 90°. The three positioning grooves 42 have the same groove width β1, and the remaining positioning groove 42 has a groove width β2 larger than the groove width β1. The groove widths β1 and β2 of the positioning groove 42 correspond to the tooth widths α1 and α2 of the positioning teeth 22. Specifically, the groove width β1 and the tooth width α1 are approximately the same, and the groove width β2 and the tooth width α2 are approximately the same. The groove widths β1 and β2 of the positioning groove 42 are set so that the positioning tooth 22 can pass through the positioning groove 42. However, the groove width β2 is larger than the groove width β1, and the positioning tooth 22 having the groove width β2 cannot pass through the groove width β1 of the positioning groove 42. As a result, the first connector 20 can enter the second connector 40 only when the positioning groove 42 with the groove width β2 matches the positioning tooth 22 with the tooth width α2. Note that one of the four positioning teeth may have a small tooth width, and one of the four positioning grooves may have a small groove width.

The cylindrical member 41 is formed with a rotation groove 44 in which the positioning teeth 22 that have passed through the positioning groove 42 rotate around the axis CL with respect to the second connector 40 when the cartridge 10 is inserted. The rotation groove 44 is formed continuously with the four positioning grooves 42. A stopper 45 is formed in the rotation groove 44 to abut at least one positioning tooth 22 so as to limit rotation of the cartridge 10 at a predetermined rotation angle. In this embodiment, the length of the rotation groove 44 up to the stopper 45 is set to about 20° as an angle about the axis CL. Note that in this embodiment, the first connector 20 is provided on the cartridge 10 and the second connector 40 is provided on the gas consumption device 30, but these may be provided in reverse.

Figure 1A:
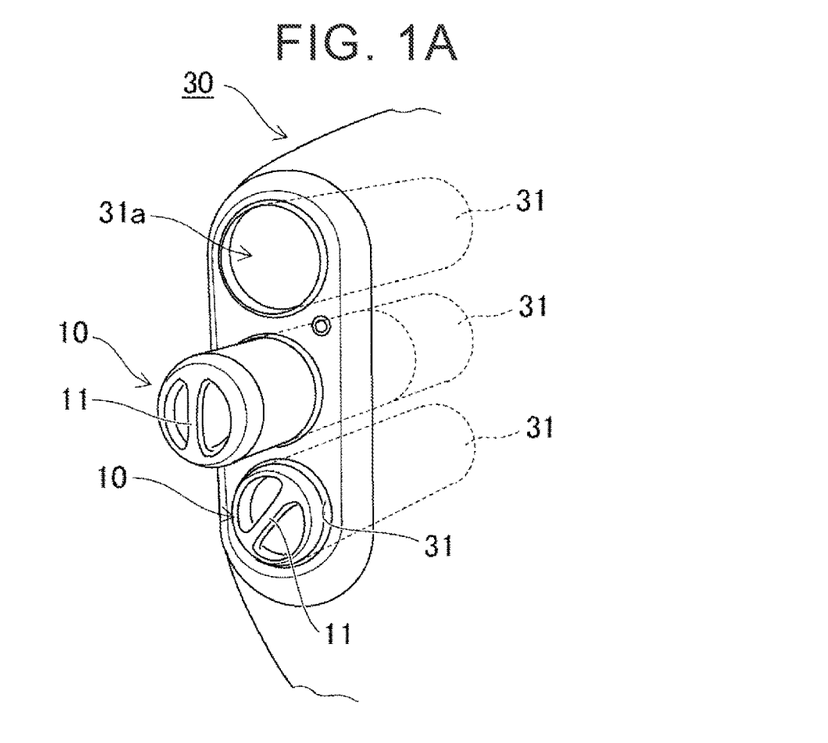
FIG. 1A is a perspective view of a main part of a cartridge mounting portion of a gas consumption device, showing an embodiment of a connection structure for a cartridge and a gas consumption device according to the present disclosure.
Figure 1B:
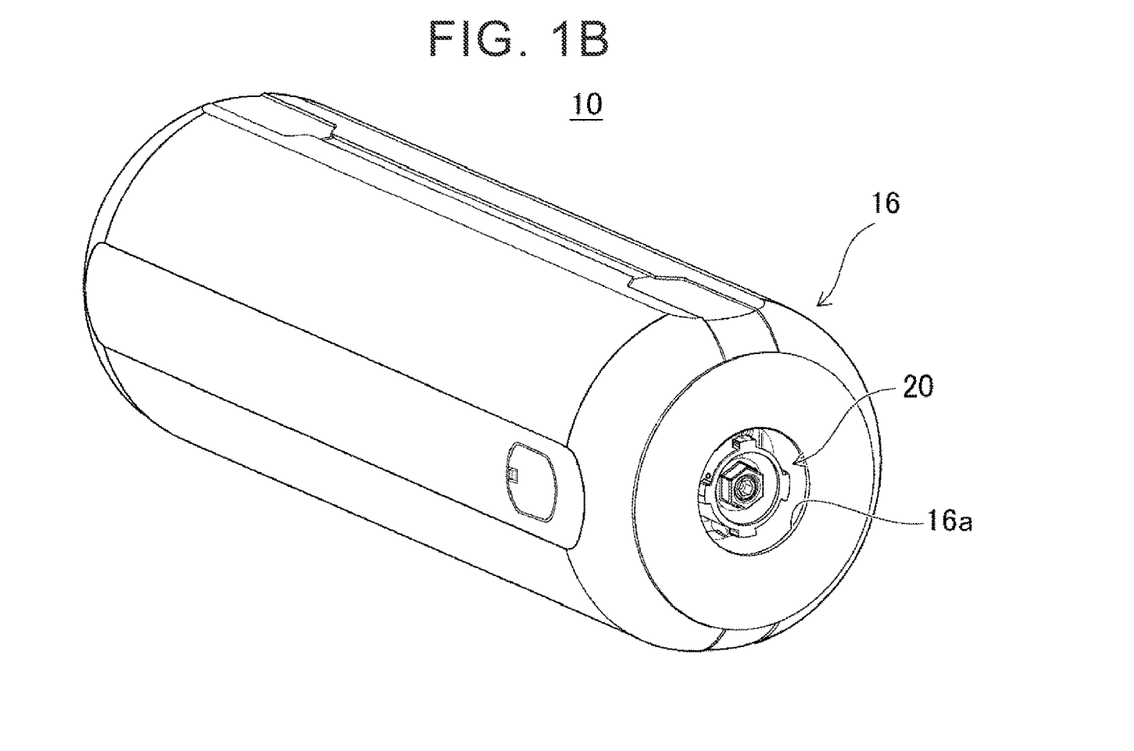
FIG. 1B is a perspective view of the cartridge shown in FIG. 1A from the gas consumption device side.

The operation of the cartridge-gas consumption device connection structure 1 of this embodiment will be explained. First, the cartridge 10 is inserted into the housing portion 31 through the insertion port 31a of the gas consumption device 30. As shown in FIG. 1A, when inserting the cartridge 10 into the second housing portion 31 from the top, the cartridge 10 is inserted into the housing portion 31 with the handle 11 of the cartridge 10 in the vertical direction (vertical direction).

At this time, the second connector 40 of the housing portion 31 of the gas consumption device 30 is in a state where the plurality of positioning teeth 22 and the plurality of positioning grooves 42 are tilted to the right by about 22°, as shown by the solid line in FIG. 5A. When the cartridge 10 is inserted deep into the housing portion 31, the plurality of positioning teeth 22 enter the plurality of positioning grooves 42. Specifically, the cylindrical member 21 of the first connector 20 enters into the cylindrical member 41 of the second connector 40, and the plurality of positioning teeth 22 pass through the plurality of positioning grooves 42. This completes the operation of inserting the cartridge 10 into the housing portion 31.

In this embodiment, the tooth width of one positioning tooth 22 of the four positioning teeth 22 is different from the tooth width of the other three positioning teeth 22. The groove width of one positioning groove 42 of the four positioning grooves 42 is different from the groove width of the other three positioning grooves 42. As a result, the positioning teeth 22 having one tooth width different from each other cannot pass through the positioning grooves 42 having another groove width. Therefore, in this insertion operation, the cartridge 10 can be inserted into the gas consumption device 30 at a specific angle around the axis of the cartridge 10.

Figure 5B:
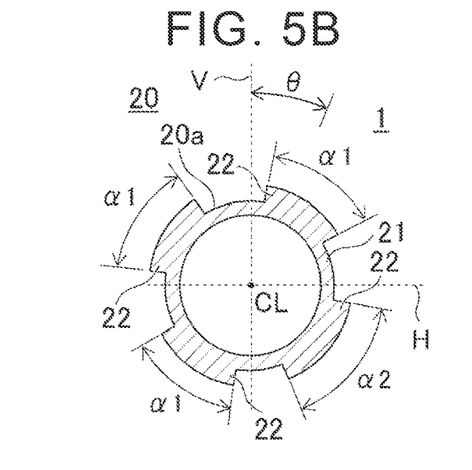
FIG. 5B is a schematic diagram showing the first connector and the second connector as seen along line AA in FIG. 3B, and showing positioning teeth of the first connector.
Figure 5C:
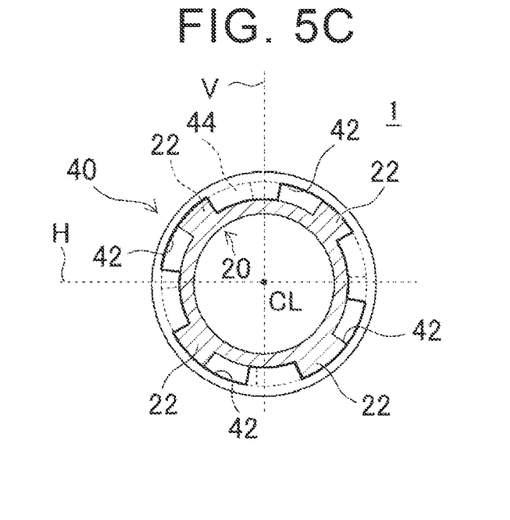
FIG. 5C is a schematic diagram showing the first connector and the second connector as seen along line AA in FIG. 3B, with the first connector engaged with the second connector.

In this way, after the insertion operation is completed, the rotation operation of the cartridge 10 is performed. Specifically, as shown in FIG. 1A, the cartridge 10 is rotated to the right, for example, by about 22°. As a result, as shown in FIG. 5B, the cylindrical member 21 of the first connector 20 rotates at the same angle in the right direction, and the positioning tooth 22 moves along the rotation groove 44 and comes into contact with the stopper 45. Rotation is stopped. As a result, the first connector 20 of the cartridge 10 is connected to the second connector 40 of the gas consumption device 30, and this connected state is reliably connected to the gas consumption device 30 at a constant rotation angle θ.

In this connected state, the stopper of the safety valve 51 melts, for example, in an extremely high temperature environment. As a result, the hydrogen gas in the tank 15 of the cartridge 10 is released. The hydrogen gas released from the tank 15 can pass through the gas release holes 50a, 50b of the safety valve plug 50 and be released from the direction regulating hole 52a of the inner ring 52 in a specific direction.

Figure 6A:
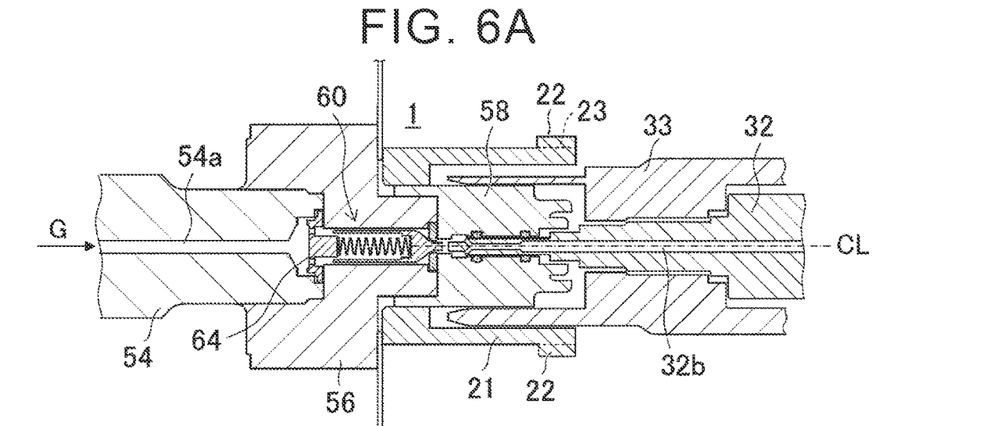
FIG. 6A is a cross-sectional view of a main part in a state in which the gas in the tank does not flow to the gas consumption device, showing the operating state of the connection structure according to the present embodiment.
Figure 6B:
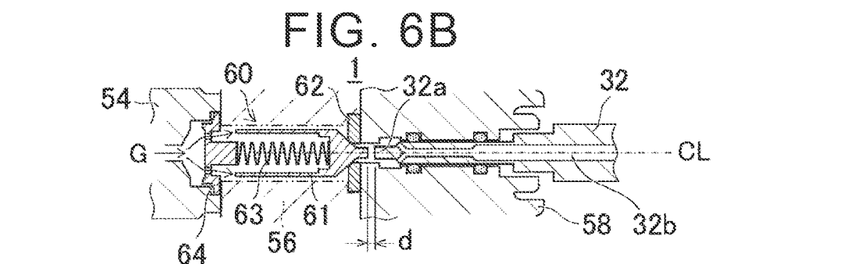
FIG. 6B shows the operating state of the connection structure according to the present embodiment, and is a further enlarged cross-sectional view of the main part of FIG. 6A.

Next, a case will be described in which hydrogen gas in the tank 15 is supplied into the gas consumption device 30 in order to use the hydrogen gas in the cartridge 10. The cartridge 10 is inserted into the housing portion 31 of the gas consumption device 30 and rotated at a predetermined angle. Thereby, the first connector 20 of the cartridge 10 is connected to the second connector 40 of the gas consumption device 30. As shown in FIGS. 6A and 6B, in this state, the abutting portion 32a of the push rod 32 faces the head of the valve body 61 of the self-closing valve 60 with a gap d therebetween. That is, since the valve body 61 is in close contact with the valve seat 62, the flow of hydrogen gas is blocked.

Figure 6C:
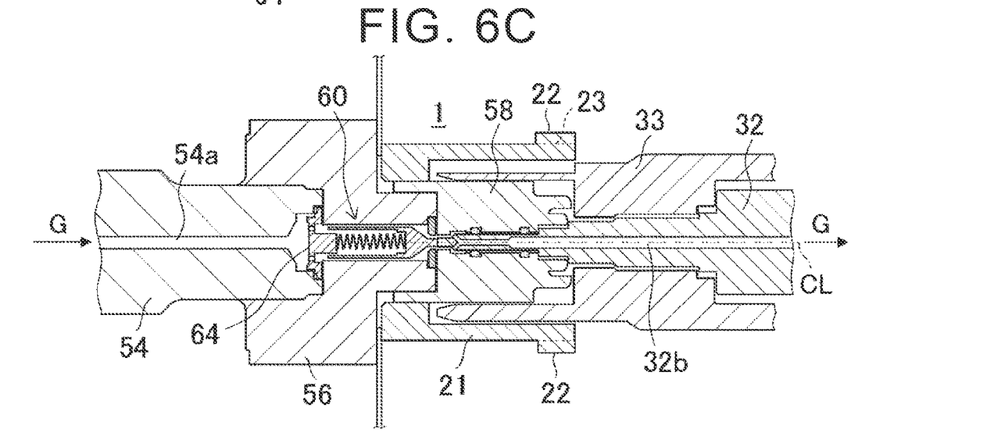
FIG. 6C is a cross-sectional view of a main part showing the operating state of the connection structure according to the present embodiment, in which gas in the tank flows to the gas consumption device.
Figure 6D:
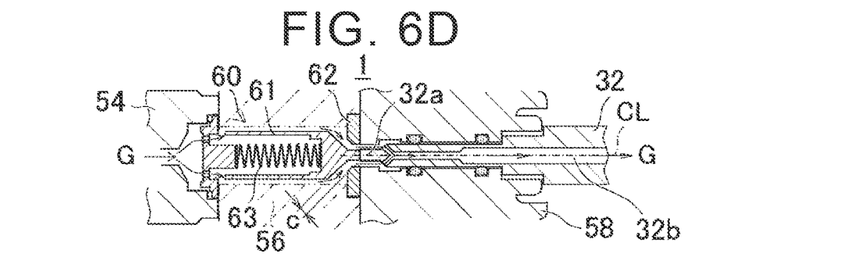
FIG. 6D is a further enlarged sectional view of a main part of FIG. 6C.

In this state, the pulling device 35 is activated to draw the tank 15 into the gas consumption device 30. That is, the valve body 56 and the self-closing valve 60 approach the fixed push rod 32, and the valve body 61 and the abutting portion 32a of the push rod 32 come into contact. As shown in FIGS. 6C and 6D, when the cartridge 10 is further retracted, the valve seat 62 is retracted together with the valve body 56 and shaft guide 58. As a result, the valve body 61 is pushed toward the internal space S of the tank 15, and a gap c is created between the valve seat 62 and the valve body 61. Therefore, the hydrogen gas G enters the push rod 32 through the gap c between the valve seat 62 and the valve body 61, and is supplied to the gas consumption device 30 through the gas flow hole 32b in the push rod 32.

When the hydrogen gas in the tank 15 is used up, the cartridge 10 is moved in the opposite direction by the pulling device 35, and the cartridge 10 is pushed out by a predetermined distance within the housing portion 31. As a result, the abutting portion 32a of the fixed push rod 32 and the valve body 61 are separated, and the self-closing valve 60 is closed. After this, the handle 11 of the cartridge 10 is rotated counterclockwise. As a result, the plurality of positioning teeth 22 of the first connector 20 are disengaged from the plurality of positioning grooves 42 of the second connector 40, and the cartridge 10 can be removed from the housing portion 31.

As described above, in the connection structure 1 for the cartridge 10 and the gas consumption device 30 of the present embodiment, the cartridge 10 can be appropriately and quickly connected to the gas consumption device 30 at a predetermined angle around the axis CL. Therefore, in an excessively high temperature environment, the stopper of the safety valve 51 melts, allowing gas to be released from the cartridge 10 in a preset direction.

What is claimed is:

1. A connection structure configured to detachably connect a columnar cartridge including a tank that stores gas and a gas consumption device configured to consume the gas with the cartridge housed in the gas consumption device, wherein:
   the cartridge includes a safety valve configured to release the gas stored in the tank in a predetermined circumferential direction of the cartridge;
   the gas consumption device includes a housing portion that houses the cartridge;
   the housing portion has an insertion port through which the cartridge is inserted along an axis of the cartridge;
   the connection structure includes a first connector provided on a distal end side of the cartridge in an insertion direction, and a second connector provided in the gas consumption device and connected to the first connector;
   one connector out of the first connector and the second connector includes an outer circumferential surface, and a plurality of positioning teeth protruding from the outer circumferential surface of the one connector is provided on the outer circumferential surface with intervals in a circumferential direction about the axis;
   the other connector includes an inner circumferential surface that faces the outer circumferential surface, and a plurality of positioning grooves each having a groove width corresponding to a circumferential tooth width of each of the positioning teeth is provided on the inner circumferential surface with intervals in a circumferential direction of the inner circumferential surface of the other connector;
   rotation grooves along which the positioning teeth that have passed through the positioning grooves rotate about the axis relative to the other connector when the cartridge is inserted are further provided on the inner circumferential surface of the other connector;

the rotation groove includes a stopper with which at least one of the positioning teeth comes into contact to limit rotation of the cartridge at a predetermined rotation angle;

the gas consumption device includes a pulling device configured to pull the cartridge housed in the housing portion into the gas consumption device with the positioning tooth in contact with the stopper;

the cartridge includes a sealing valve configured to seal an internal space of the tank with a valve body by urging the valve body toward an outside of the tank along the axis; and the gas consumption device includes a push rod configured to push the valve body toward the internal space to open the sealing valve by pulling the cartridge with the pulling device.

2. The connection structure according to claim 1, wherein the tooth width of at least one of the positioning teeth is different from the other tooth widths.

* * * * *